Nov. 7, 1933.   A. O. ABBOTT, JR   1,933,692
METHOD OF MAKING TIRES AND PRODUCT
Original Filed July 30, 1926
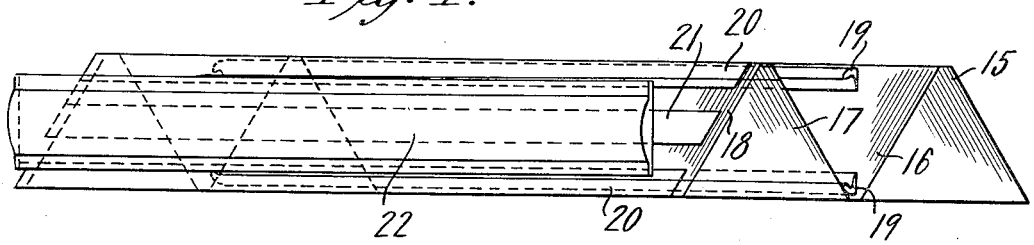
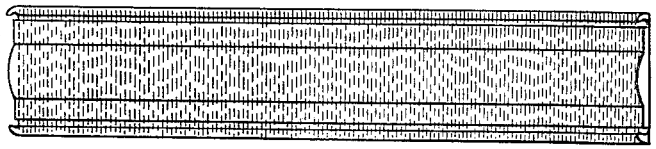
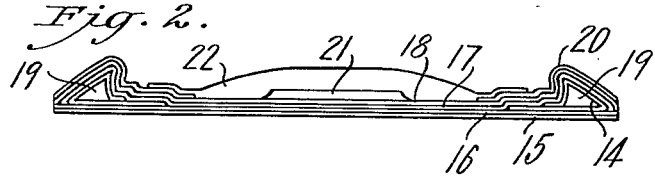
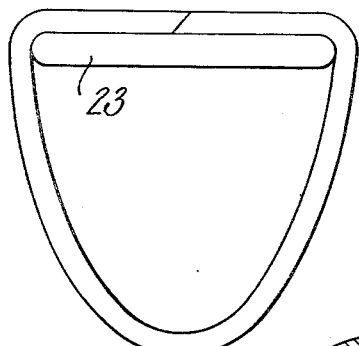
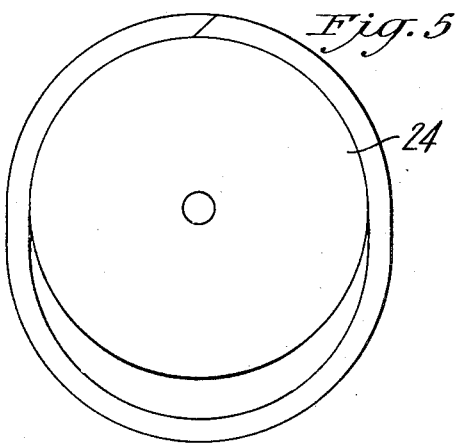
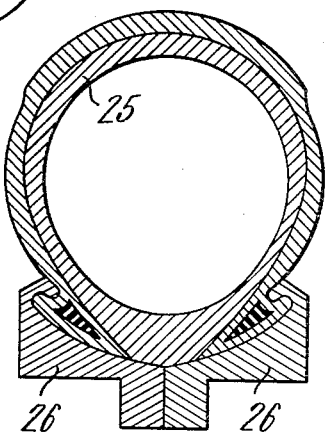
INVENTOR
ADRIAN O. ABBOTT, JR.
BY
ATTORNEY Patented Nov. 7, 1933

1,933,692

UNITED STATES PATENT OFFICE 1,933,692

METHOD OF MAKING TIRES AND PRODUCT

Adrian O. Abbott, Jr., Detroit, Mich., assignor to Morgan & Wright, Detroit, Mich., a corporation of Michigan Original application July 30, 1926, Serial No. 125,929. Divided and this application April 21, 1931. Serial No. 531,707

9 Claims. (Cl. 154—14)

This application is a division of my Patent 1,836,057, issued December 15, 1931.

This invention relates to pneumatic tires for vehicles and methods of making the same, but more particularly to an improvement in the art of flat building such tires and has for its primary objects to facilitate the construction and provide an improved tire.

The invention is particularly applicable to the manufacture of either straight side or clincher tires and consists primarily in building the tire carcass in the form of a slab containing most of the elements of the built tire including the bead material and thereafter splicing the ends of the slab to bring the same to annular form. The spliced slab or "pulley band" as it is generally termed is then shaped or expanded in any well-known manner, as for example the vacuum method, and subsequently vulcanized.

Further objects are to eliminate the necessity for the exercise of considerable ingenuity and skill and the expenditure of time in interlocking plies and turning them over the beads separately; to eliminate the step-offs of the turn plies and thus largely overcome the tendency of the tire to break at the edge of such ply; and to provide a simple and effective method of arranging and splicing the elements of the tire.

The many other objects and advantages of the invention will be better understood by reference to the following specification when considered in connection with the accompanying drawing illustrating a selected embodiment thereof in which;

Figure 1 is a top plan view of a tire slab provided by way of example with beads suited to the clincher type tire;

Figure 2 is an enlarged end elevation of the slab shown in Fig. 1;

Figure 3 is a transverse section of the formed tire ready for vulcanization;

Figures 4 and 5 are diagrammatical side elevational views illustrating methods of supporting the slab during the splicing operation;

Figure 6 is a top plan view of a modified form of clincher tire slab construction.

Referring particularly to the drawing, the initial step is the formation of a slab which is illustrated in Fig. 1. This particular slab consists of four plies of rubber impregnated cord fabric designated 15, 16, 17 and 18, bead 19—19, chafing strips 20—20, a breaker 21 and tread 22. Other elements of a tire such as a cushion or sidewall strips may be added. The tread in this embodiment has been made sufficiently wide to serve as sidewalls also. The cord fabric has been cut on the bias in the usual manner so that the ends of the strip are oblique to the cut or longitudinal edges thereof. The number of plies and order of arrangement of the elements will naturally be varied in different sizes and types of tire. In the present embodiment two plies are superimposed, the lengths of bead material which are encased in a bead wrap 14 are placed in position just within the edges of the two plies of fabric on the upper of these plies with the protruding edges of the bead wrap extending inwardly, the remaining plies are then superimposed thereon, the chafing strips 20—20 and the breaker 21 placed on the uppermost ply, and finally the tread placed over the breaker. The bead material may be either the extensible type for use in clincher tires, or the inextensible type for use in the straight sidewall tires.

The strips of fabric which are placed above the bead material in the assembly are preferably of greater width than the strips lying below the bead material. This allows of their extending out to a point even with or just beyond the toe of the bead material. The ends of the plies are preferably stepped off in the manner illustrated, an end of each ply overlapping the end of the next adjacent ply, and alternate plies are inverted so that the cords in adjacent plies cross each other at an angle. The ends of each strip are preferably formed parallel with each other and when brought into splicing position have a slight overlap. Other arrangements of the ends of the strips may be made for splicing if desired. The step-off of the plies exposes the beads 19—19 (see Fig. 1). The tread 22 is preferably also stepped from the breaker to facilitate the splicing. The operation of forming the slab may be performed either manually or by machine as will be readily evident. It is contemplated in this invention to build all sizes of pulley-bands, and the beads may be inserted between any two strips of fabric.

Having completed the building of the slab the next step is the splicing of the ends thereof to form the pulley-band. It is preferable to splice the individual elements successively. For example, in the embodiment shown in Fig. 1 the ply 15 would first be spliced and then the remaining elements in the following order: the ply 16, the beads 19—19 the plies 17 and 18, the chafing strips 20—20, the breaker 21, and the tread 22. However, the splicing of all the elements of the slab may take place simultaneously. Fig. 4 illustrates one method of supporting the end portions of the slab during the splicing operation, in which these portions rest upon a flat member 23. Fig. 5 illustrates a supporting drum 24 used for the same purpose. By stepping the elements in the manner described, the ends will naturally lap.

After a pulley-band has been formed by splicing of the slab, it may then be expanded or brought to tire form. This may be accomplished by any suitable method, but the well known vacuum system is believed to be preferable. A curing bag 25 or any suitable core is then introduced, as shown in Fig. 3, the combination is mounted on curing rings as 26, then introduced into a mold and vulcanized in the usual manner.

It will be apparent from the end elevation of the completely assembled slab shown in Fig. 2 that when completed a clincher tire has been made in which the plies do not necessarily turn around the toes of the bead. The plies run straight out and terminate adjacent the toe of the bead. Preferably the outside edges of the plies lie even with or a little beyond the toe of the bead. This method of construction results in a saving of fabric.

Fig. 6 illustrates a slightly different application of the method forming the present invention. The slab shown here comprises the same elements as the one shown in Fig. 1, and differs therefrom principally in that the plies are cut so that the cords therein extend transversely thereof distinguished from obliquely, and the elements are not stepped off at their ends. This materially simplifies the building of the slab and the splicing of the ends. All material may be run together in continuous lengths and the whole severed into separate slabs either manually or by a mechanically operated knife (not shown). Suitable measuring apparatus should be provided to insure the proper length of the slab. The ends of these slabs should preferably be provided with a tapering surface so that they will have elongated meeting surfaces which will adhere securely when spliced. In this form all of the elements are preferably spliced substantially simultaneously.

It will be evident from the foregoing description that the method of building tires forming the subject matter of the present invention facilitates the construction and provides an improved tire. The various steps are simply and easily performed and do not require the exercise of particular ingenuity or skill. Considerable time is saved by the elimination of the usual interlocking plies and the turning of these plies over the bead separately. The turning inwardly of the fabric over the bead facilitates the insertion of the bead ring and permits of a smoother outside wall. The elimination of step-offs on the outside of the tire overcomes the tendency of the tire to break along the edges of the plies. The pressure on the inside of the tire when in use tends rather to compress the turn plies and to hold them together and not to tear them apart.

An application of the method forming the subject matter of this invention has been hereinbefore particularly described but it is to be understood that it is solely for the purpose of illustration as different embodiments of the invention may be made without departing from the spirit thereof and it is not intended that the invention should be limited to any specific form except as determined by the scope of the appended claims.

Having thus described my invention what I claim and desire to protect by Letters Patent is:

1. As an article of manufacture, a slab of material for tire manufacture, comprising superposed fabric plies, the ends of adjoining plies being stepped and oppositely diagonally inclined, bead forming elements disposed between the plies adjacent the edges of the latter, and tread forming elements disposed on said plies.

2. As an article of manufacture, a slab of material for tire manufacture comprising a plurality of superimposed plies of fabric, lengths of bead material associated therewith, the edge portions of the fabric terminating at the outer edge portion of the corresponding bead material.

3. As an article of manufacture, a slab of material for tire manufacture comprising a plurality of superimposed plies of fabric, lengths of bead material interposed therebetween, the plies of fabric on one side of the bead material being of greater width than the plies on the other side of the bead material, the edge portions of the fabric terminating at the outer edge portion of the lengths of bead material.

4. In the method of building a tire casing, the steps which comprise superimposing strips of fabric upon a substantially flat surface, applying lengths of bead material upon the longitudinal edge portions of the upper strip of fabric, applying additional strips of fabric of greater width than the first mentioned strips upon the upper surface of the previously assembled elements whereby a flat slab is formed, the fabric plies of which extend the same distance transversely.

5. A method of making a clincher pneumatic tire which comprises superposing a plurality of layers of material in flat strip form, the ends of each layer being cut off on the bias and successive layers being stepped off so as to expose the full width of the layers underneath, placing bead fillers between certain of said layers, overlapping the ends of the laminated strip thus formed, and expanding the flat annulus to tire form.

6. A method of making a clincher pneumatic tire which comprises superposing a plurality of layers of bias-cut rubberized cords in flat strip form, the ends of each layer being cut off on the bias and the successive layers being stepped off so as to expose the full width of the layers beneath, the stepping off being in opposite directions at the two ends of the strip, placing bead fillers between certain of said layers, folding certain of said layers around the bead fillers except at one end of the flat strip, overlapping the ends of the laminated strip thus formed, so as to cause the bead fillers to abut and the stepped off ends of the layers to overlap, completing the folding of the layers around the bead fillers, and expanding the flat annulus to tire form.

7. A method of building a tire casing which consists in superimposing and splicing the fabric plies and the tread and applying bead material in the proper order to form an elongated slab, splicing the ends of the formed slab to form a pulley band, expanding the pulley band to tire form, and vulcanizing.

8. A method of making a pneumatic tire which comprises superposing a plurality of layers of material to form an elongated slab, the adjacent layers being staggered with respect to each other, placing bead fillers between certain of said layers, overlapping the ends of the laminated slab thus formed to obtain a pulley band, and expanding the pulley band to tire form.

9. A method of making a pneumatic tire which comprises superposing a plurality of layers of material to form an elongated slab, the ends of most of the layers being cut off on the bias and the adjacent layers being staggered with respect to each other, placing bead fillers between certain of said layers, folding certain of said layers around the bead fillers except at one end of the slab, overlapping the ends of the slab thus formed to obtain a pulley band, completing the folding of the layers around the bead fillers, and expanding the pulley band to tire form.

ADRIAN O. ABBOTT, JR.